Jan. 29, 1963    TASABURO YAMAGUTI    3,075,869
MANUFACTURING METHOD OF THE SODIUM NITRATE POLARIZERS
Filed April 3, 1959

INVENTOR
TASABURO YAMAGUTI

BY James M. Drysdale
ATTORNEY

3,075,869
Patented Jan. 29, 1963

3,075,869
MANUFACTURING METHOD OF THE SODIUM NITRATE POLARIZERS
Tasaburô Yamaguti, 97 Matsunamicho, Chiba City, Japan
Filed Apr. 3, 1959, Ser. No. 803,919
2 Claims. (Cl. 156—99)

This invention relates to an improved method of manufacturing sodium nitrate polarizers.

The present invention permits glass prisms to be assembled as a polarization prism without being immersed in melted sodium nitrate. A thin film of sodium nitrate melt is drawn up between the glass prisms by capillary action and then crystallized into a single crystal of sodium nitrate binder which firmly bonds the glass prisms. One object of the present invention is to present a method of manufacturing a sodium nitrate polarization prism of superior quality, due to the fact that the polarization prism can be produced in a state of non-strain which can be ascribed to smallness of quantity of sodium nitrate attached to boundary surfaces of the polarization prism. The small quantity of sodium nitrate also permits shortening of the annealing time for the crystal. Other objects will appear in the description of the invention.

Figure 1:
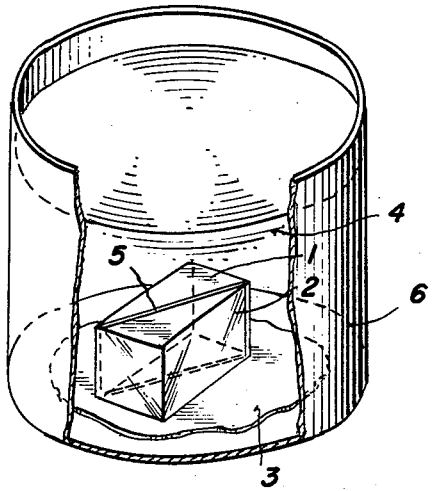
FIG. 1 illustrates the prior art wherein is shown a known arrangement of materials for making sodium nitrate polarization prisms.
Figure 2:
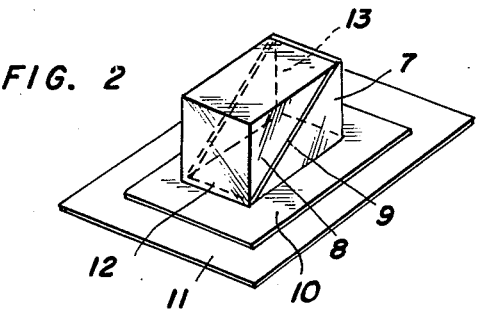
FIG. 2 shows an example of the arrangements of the materials for the manufacturing method for the polarization prism according to this invention.

As shown in FIGURE 2, wedge-shaped glass prisms 7 and 8 have a thin film 9 of a melt of sodium nitrate formed between them by capillary action even though the prisms are not immersed in the melt. The prisms are arranged on a mica sheet 10 which has a small amount of sodium nitrate placed thereon. The mica sheet is then placed on a brass plate 11 which is heated to a temperature higher than the melting point of sodium nitrate. A small amount of sodium nitrate thus melted proceeds from the melt on the mica sheet to the narrow space between the glass prisms.

After setting in parallel the two faces 12 and 13 of the prisms through which light is to enter and leave, cooling of the materials making up the polarization prism begins and the thin film 9 of the melt crystallizes into a single crystal, joining the two wedge-shaped glass prisms 7 and 8 to form the finished polarization prism after further cooling to room temperature.

An advantage of the present invention is that it is easy to adjust the alignment of the glass prisms so that their end faces 12 and 13 are in parallel by observing fine straight lines through the glass prisms. Another advantage is not only that the glass prisms are not destroyed by stresses, but no strains remain in the polarization prism due to the smaller quantity of sodium nitrate crystal that becomes attached to boundaries of the prism. Yet another advantage is that removal of the extraneous sodium nitrate crystal attached in small quantity to the outer boundaries of the glass prisms is quite easy without any danger of destroying the polarization prism by cracks which are apt to be made between the glass prism and the thin single crystal of sodium nitrate as when removing a large quantity of the crystal.

The method has been described with reference to glass prisms, but instead of glass an amorphous solid such as fused silica or single crystals such as a sodium chloride may be used as material for the polarization prism.

Figure 3:
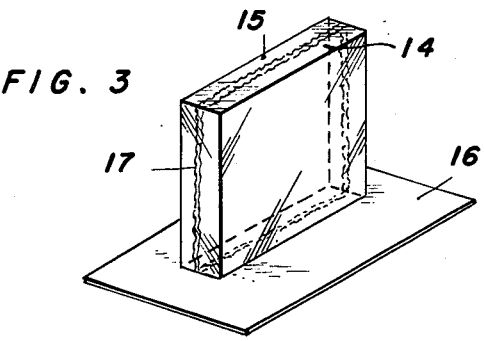
FIG. 3 shows an example of the arrangements of the materials for the manufacturing method invented for the sodium nitrate polarization plate of scattering type.

The method of the present invention can be applied to the manufacture of a polarization plate of the scattering type described in the Journal of the Optical Society of America (vol. 45, No. 10, October 1955, pages 891–892). FIG. 3 shows two glass plates 14 and 15 each having one rough ground face. These faces, slightly separated, face each other; the other outside faces of the plates are polished. Two side edges of the plates are placed on a mica sheet 16. A small amount of melted sodium nitrate, which is arranged on the mica sheet, proceeds from the melt on the mica to narrow space between the two glass plates and between the side edges and the mica sheet by capillary action even though the plates and the mica sheet are not immersed in a melt. When there is slow cooling from the mica side, a thin single crystal of sodium nitrate 17 forms between the two plates in most cases with its optical axis normal to the mica sheet and this crystal firmly bonds the plates. The plates thus bonded are cooled to room temperature and can be used as a polarizer of the scattering type, one polarized component of natural light being scattered by the rough faces between the glass and the crystal and another component penetrating through the plates. For some purposes the polarization plate may have one of its two glass plates with two polished faces, and the other plate with one polished and one ground face. In such cases the crystal connects a polished and a rough face of the plates.

It is understood that if the prisms made in accordance with this invention are of amorphous solid they can be penetrated by ultra violet rays and if the glass prisms are composed of prisms of a single crystal they can be penetrated by light of the infra-red.

It is to be understood that the various forms of the construction shown are illustrative only, as the invention may be further modified to meet different conditions and requirements. I, therefore, contemplate such variations as come within the spirit and scope of the appended claims.

I claim:

1. A method of manufacturing a sodium nitrate polarizing prism which consists in placing a small amount of sodium nitrate on a mica sheet, placing thereon two glass prisms arranged to face each other, placing the mica sheet on a brass plate, heating the same above the melting point of sodium nitrate whereby a small amount of liquid of sodium nitrate thus melted proceeds from the melt on the mica sheet into the narrow space between the two glass prisms because of capillary action, then cooling the same to form a single crystal between the two glass prisms and bonding them into a polarization prism.

2. A method of manufacturing a sodium nitrate polarizing prism of the scattering type which consists in placing two glass plates having their ground faces facing each other upon a mica sheet upon which a small amount of sodium nitrate has been placed, placing the mica sheet on a brass plate, heating the same above the melting point of sodium nitrate whereby a small amount of liquid of sodium nitrate thus melted proceeds from the melt on the mica sheet into the narrow space between the two glass plates because of capillary action then cooling the same to form a single crystal between the glass plates and bonding same to form a polarization prism of the scattering type.

(References on following page)

References Cited in the file of this patent

UNITED STATES PATENTS

| | | |
|---|---|---|
| 2,104,949 | Mark | Jan. 11, 1938 |
| 2,199,227 | Mark | Apr. 30, 1940 |

OTHER REFERENCES

Yamaguti: Article in the Journal of the Optical Society of America, vol. 45, No. 10, pages 891–892, October 1955.

West: "A Method of Growing Oriented Sections of Certain Optical Crystals," Journal of the Optical Society of America; vol. 35, No. 1 (January 1945), pp. 26–31 relied upon.

Synthetic Polarizers: Scientific American (May 1945); page 294 relied upon.

Longchamp: "Prismes Polariseurs à Lame de Nitrate de Sodium"; pages 94–98 are relied upon.

Brewster et al.: "On the Production of Crystalline Structure in Crystallized Powders by Compression and Traction," London Edin., Dublin Philosophical Magazine, vol. 6, 4th series, October 1853.